Patented July 4, 1933

1,916,621

UNITED STATES PATENT OFFICE

HERBERT KRACKER, OF FRANKFORT-ON-THE-MAIN, GERMANY, ASSIGNOR TO GENERAL ANILINE WORKS, INC., OF NEW YORK, N. Y., A CORPORATION OF DELAWARE

AZO DYESTUFF AND FIBER DYED THEREWITH

No Drawing. Application filed March 12, 1931, Serial No. 522,171, and in Germany March 19, 1930.

The present invention relates to an azo-dyestuff and fiber dyed therewith.

Dyestuffs yielding Turkey red tints of extremely good fastness to light and to boiling lye (boiling for 6 hours at atmospheric pressure with 100 cc. of caustic soda solution of 40° Bé. in 10000 cc. of water per 1000 grams of material), that is to say, dyestuffs which as regards their properties of fastness are almost equal to alizarine red itself, are very much in demand by the cotton dyeing industry.

I have found that a Turkey red dyestuff of very good fastness to boiling lye which fulfils high requirements in respect of fastness to light, is obtainable by combining 2:3-hydroxynaphthoyl-1'-amino-3'-chloro-2':4'-dimethoxybenzene with diazotized 1-amino-3-methyl-4:6-dichlorobenzene.

The dyestuff according to this invention is characterized by the following formula:

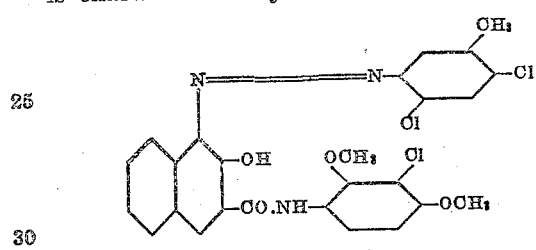

It can be prepared in the manner usually applied in the manufacture of ice colors by dyeing or printing it on the fiber or by producing it in substance or on any of the usual substrata adapted for the production of lakes.

2:3 - hydroxynaphthoyl - 1' - amino - 3' - chloro-2':4'-dimethoxy-benzene may be obtained as follows:

By causing one molecular proportion of 1-nitro-2:3:4-trichlorobenzene (cf. Annalen der Chemie, vol. 192, page 235) to react with 2 molecular proportions of sodium methylate there is obtained 1-nitro-3-chloro-2:4-dimethoxybenzene (feebly yellow needles melting at 55° C.-56° C.) which is then reduced to 1-amino-3-chloro-2:4-dimethoxybenzene (a white crystalline mass having a boiling point of 172° C.-173° C. under 20-21 mm. pressure and crystallizing from petroleum ether in white needles which melt at 32° C.-34° C. and are very liable to oxydation). The latter product is condensed with 2:3-hydroxynaphthoic acid to produce 2:3-hydroxynaphthoyl - 1'-amino-3'-chloro-2' 4'-dimethoxybenzene, which forms, when recrystallized from glacial acetic acid, white needles which melt at 214° C.-215° C., are scarcely soluble in organic solvents and dissolve in dilute caustic soda lye to a yellow solution.

The following examples serve to illustrate the invention:

EXAMPLE 1 a.—*Grounding liquor*

5 grams of 2:3-hydroxynaphthoyl-1'-amino-3'-chloro-2':4'-dimethoxybenzene are dissolved in boiling water with 10 cc. of Turkey red oil of 50 per cent. strength and 10 cc. of caustic soda solution of 34° Bé. and the whole is cooled to 50° C.; 5 cc. of formaldehyde of 30 per cent. strength are then added and after the whole has been allowed to stand for some time it is made up to 1 liter.

b.—*Dye-bath*

1.76 grams of 1-amino-3-methyl-4:6-dichlorobenzene are diazotized with 3.8 cc. of hydrochloric acid of 22° Bé. and 7.2 cc. of sodium nitrite solution (1:10), while cooling with ice. The diazo-solution is rendered neutral by means of about 2 grams of crystallized sodium acetate and about 1 gram of sodium bicarbonate; 25 grams of sodium chloride are added and the whole is made up to 1 liter.

c.—*Dyeing prescription*

50 grams of boiled cotton yarn are treated for half-an-hour in the grounding liquor at 30° C.-40° C. and well freed from water by hydro-extraction or squeezing. The material is then dyed for half-an-hour in the dye-bath, well rinsed, soaped at boiling temperature, rinsed again and dried.

There is obtained a Turkey red dyeing of very good fastness to light, to chlorine and to weather. By boiling the dyed material, for instance, for 6 hours with 10 per cent. of its weight of caustic soda solution of 34° Bé. in a proportion to the liquor of 1:10, it also shows a very good fastness to boiling lye.

EXAMPLE 2

17.6 grams of 1-amino-3-methyl-4:6-dichlorobenzene are diazotized with 38 cc. of hydrochloric acid of 22° Bé. and 7.2 grams of sodium nitrite with addition of ice. The diazo-solution is rendered neutral to Congo paper by means of about 20 grams of crystallized sodium acetate.

At the same time there are dissolved 35.8 grams of 2:3-hydroxynaphthoyl-1'-amino-3'chloro-2':4'-dimethoxybenzene in 100 cc. of 2N-caustic soda solution while adding water and heating. After the solution has been cooled the arylide is precipitated in a finely dispersed state by addition of 100 cc. of 2N-acetic acid and 5 cc. of Turkey red oil of 50 per cent. strength.

The diazo-solution obtainable as above described is run into the suspension of the arylide. After stirring for some time the formation of the dyestuff is finished. It is filtered by suction and washed with water.

It represents a bluish-red paste of very good fastness to light.

EXAMPLE 3 a.—*Grounding liquor*

20 grams of 2:3-hydroxynaphthoyl-1'-amino-3'-chloro-2':4'-dimethoxybenzene are dissolved in boiling water with 40 grams of Turkey red oil of 50 per cent. strength and 40 cc. of caustic soda solution of 34° Bé. and the whole is made up to 1 liter.

b.—*Diazo-printing color*

17.6 grams of 1-amino-3-methyl-4:6-dichlorobenzene are well stirred to form a paste with 38 cc. of hydrochloric acid of 22° Bé. and 50 cc. of water, cooled by addition of 300 cc. of ice water and diazotized with 7.2 grams of sodium nitrite. The whole is made up to 500 cc. and thickened with 480 grams of tragacanth 60:1000 and neutralized by means of 20 grams of crystallized sodium acetate.

c.—*Printing prescription*

The cotton material is padded with the grounding solution, dried and then printed with the diazo-printing color. It is then washed and soaped at boiling temperature. There is obtained a Turkey red dyeing having the fastness properties mentioned in Example 1.

I claim:

1. As a new product, the azo-dyestuff of the following formula:

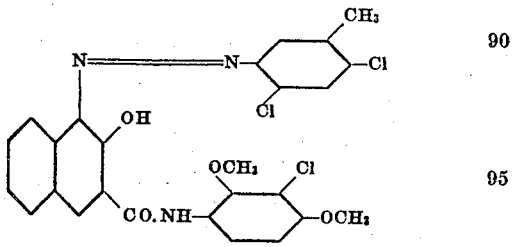

dyeing a Turkey red tint and being distinguished by its good fastness properties, particularly by its good fastness to boiling lye and to light.

2. Fiber dyed with the azo-dyestuff as claimed in claim 1.

In testimony whereof, I affix my signature.

HERBERT KRACKER.